Figures 1, 2:
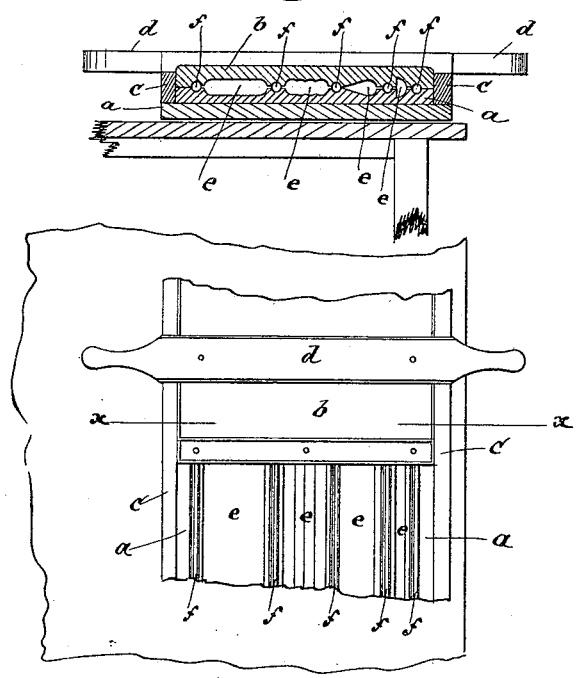

(No Model.)

M. E. THIEME.
MACHINE FOR ROLLING ALMOND PASTE.

No. 353,765. Patented Dec. 7, 1886.

WITNESSES:
T. Turner
Rob't F. Roy.

INVENTOR
Moritz Eugen Thieme
BY Roeder & Briesen
ATTORNEYS.

United States Patent Office.

MORITZ EUGEN THIEME, OF LEIPSIC, SAXONY, GERMANY.

MACHINE FOR ROLLING ALMOND PASTE.

SPECIFICATION forming part of Letters Patent No. 353,765, dated December 7, 1886.

Application filed March 5, 1886. Serial No. 194,092. (No model.)

*To all whom it may concern:*

Be it known that I, MORITZ EUGEN THIEME, of Leipsic, Germany, have invented a new and Improved Machine for Rolling Almond Paste, of which the following specification is a full, clear, and exact description.

In rolling out almond paste it is desirable that the waste does not crumble away from the body of the dough, but that it is preserved in a compact mass. To this effect I have constructed a machine in which the mold-cavities are provided with connecting-grooves, into which the surplus of the dough is crowded.

The invention consists in the elements of improvement hereinafter more fully pointed out.

In the accompanying drawings, Figure 1 is a top view of my improved machine, and Fig. 2 is a cross-section on the line x x, Fig. 1.

The letter a represents the lower plate of the machine, such plate constituting the lower and stationary half of a mold.

b is the upper mold-plate, adapted to slide upon the lower plate between side rails, c c, projecting upward from the latter. To properly operate the plate b it is provided with a handle, d.

The plates a b are provided on their contiguous faces with a number of grooves or chambers, e, part of each chamber being formed in the upper and part in the lower plate. Each of the chambers e is connected by a narrow passage cut into either of the plates a b with small longitudinal grooves f. These grooves are located at the sides of the chambers e, as shown.

In use a long and narrow piece of almond paste is placed into the cavities of the lower plate, a, and then the upper plate is passed over the same. Thus the paste will be properly molded, the surplus escaping into the grooves f.

I claim as my invention—

1. The combination of plates a and b, forming the chambers e, with the grooves f, connected to said chambers, substantially as specified.

2. The combination of plate a, having rails c, with sliding plate b, having handle d, said plates forming chambers e between them, and with grooves f, connected to said chambers, substantially as specified.

In testimony whereof I have signed my name to this specification in the presence of two subscribing witnesses.

MORITZ EUGEN THIEME.

Witnesses:
EDMUND BACH,
RICHARD NÜRNBERGER.